United States Patent

[11] 3,613,519

| [72] | Inventor | John N. Southall |
| | | Dudley, England |
| [21] | Appl. No. | 799,627 |
| [22] | Filed | Feb. 17, 1969 |
| [45] | Patented | Oct. 19, 1971 |
| [73] | Assignee | Serck Industries Limited |
| | | Birmingham, England |
| [32] | Priority | Feb. 22, 1968 |
| [33] | | Great Britain |
| [31] | | 8635/68 |

[54] PRESSURE FLUID OPERATED ACTUATORS
4 Claims, 4 Drawing Figs.

[52] U.S. Cl. .................................................. 92/125
[51] Int. Cl. .................................................. F01c 9/00
[50] Field of Search .................................... 92/125,
121, 122, 123, 124, 170, 248, 120; 103/114;
277/133

[56] References Cited
UNITED STATES PATENTS

| 2,553,973 | 5/1951 | Keller et al. | 92/85 |
| 2,846,943 | 8/1953 | Belk | 103/114 |
| 2,975,763 | 3/1961 | Grace | 92/125 X |
| 3,053,236 | 9/1962 | Self et al. | 92/125 |
| 3,066,654 | 12/1962 | Matt | 92/125 |
| 3,125,004 | 3/1964 | White | 103/114 X |
| 3,180,267 | 4/1965 | Bemmann et al. | 103/114 X |
| 3,289,549 | 12/1966 | Purcell | 92/125 |
| 3,359,870 | 12/1967 | Purcell | 92/125 X |

Primary Examiner—Martin P. Schwadron
Assistant Examiner—Irwin C. Cohen
Attorney—Norris & Bateman ABSTRACT: A pressure fluid rotary vane actuator in which the actuator housing is formed of thermosetting resin and the rotary vane is encapsulated in an integrally molded rubber covering.

PATENTED OCT 19 1971 3,613,519

INVENTOR
JOHN N. SOUTHALL
By Norris & Bateman

PRESSURE FLUID OPERATED ACTUATORS

The invention relates to a pressure fluid operated actuator wherein a rotary vane divides a housing into two actuating chambers and has for an object to provide an actuator having an improved seal and hence an improved operating efficiency.

To this end an integral rubber lining is molded upon the sealing surface of the vane or chamber.

Embodiments of the invention are shown in the accompanying drawings wherein

Figure 1:
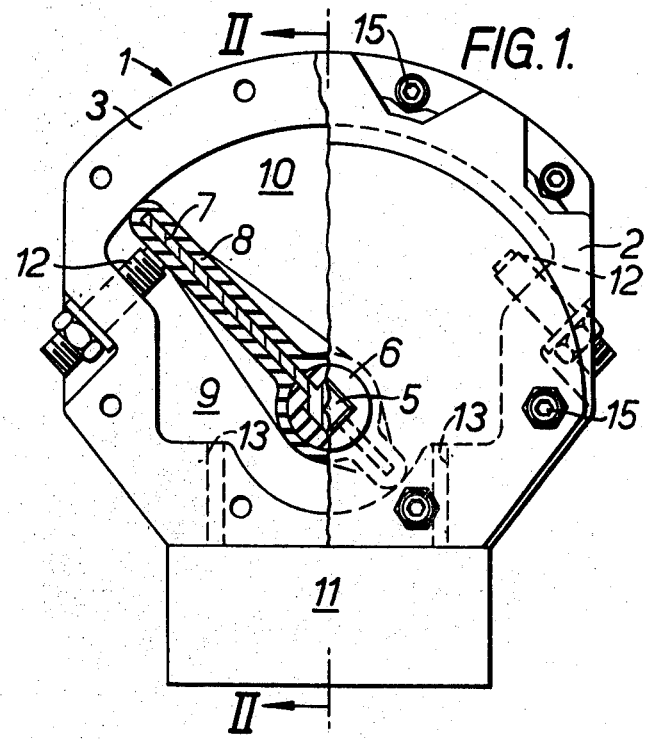
Figure 3:
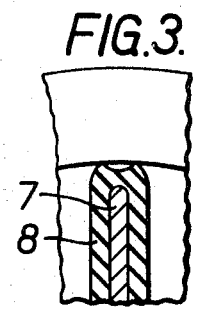
Figure 2:
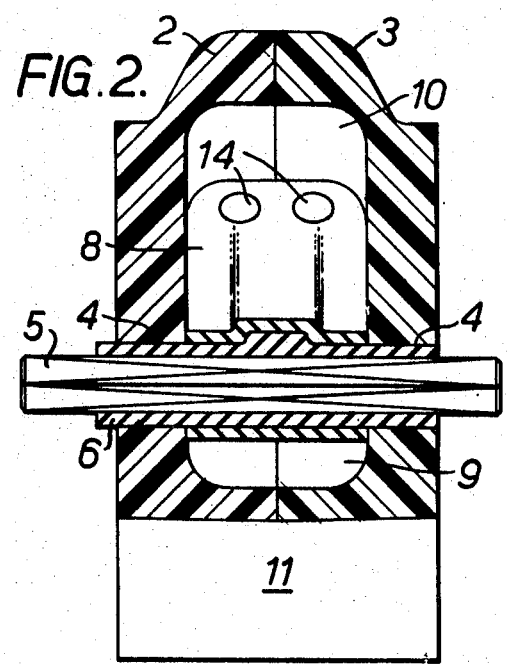
Figure 4:
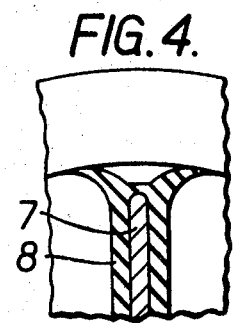

FIG. 1 is a view partly in section of a pneumatic actuator according to the present invention, FIG. 2 is a section along the line II—II of FIG. 1, and FIGS. 3 and 4 illustrate modifications in the shape of the sealing surface.

In the pneumatic actuator shown in FIGS. 1 and 2, a valve housing 1 is constructed from two housing halves 2 and 3 of a suitable thermosetting resin, such as glass-reinforced polyester having passages 4 for the mounting of a shaft comprising a mold steel core 5 of square section around which is cast an aluminum vane 7 having shoulders 6 of circular section with the shaft axis perpendiuclar to the plane in which the halves are connected. The vane 7 is encapsulated in a rubber lining 8 which fits tightly within the housing, dividing the housing into two operating chambers 9 and 10. The rubber casing 8 of the shaft abuts against the housing wall about the shaft passages 4 thus sealing the chambers against leakage to the atmosphere.

A four-way spool valve 11 is mounted directly onto the actuator housing 1 and controls the admission of air to, and the release of air from, the actuating chambers 9 and 10 through passages 13 to move the vane between its two stable positions. The internal design of the housing permits the vane to rotate by over 90° and adjustable stops 12 are provided in the housing wall on each side of the vane so that an exact 90° movement may be obtained. Metal bearing caps 14 may be fitted on the rubber lining to engage the stops.

The torque output of the unit is a direct function of the vane geometry, physical size and air pressure. With a rubber-encapsulated vane a good seal is maintained between the chambers under dynamic and static conditions leading to a minimum air consumption and maximum efficiency.

The formation of the valve housing in two halves which are joined by tightening screws 15 together against the edge of the rubber-lined vane permits close control of the interference tolerance between the vane and housing to provide an optimum low static torque compatible with leak-tightness, that is optimization of the leaktight torque characteristics.

Such an actuator is especially suited for the power operation of rotary shutoff valves having 90° of movement between their open and closed positions.

The sealing surface along the edge of the rubber lining may be shaped to give optimum sealing characteristics between the chambers. In the form shown in FIG. 1 the edge is convex. In the form shown in FIG. 3 the surface is concave, meeting the housing surface along two spaced lines. The rubber is energized by compression between the housing and vane to maintain a positive seal. In the form shown in FIG. 4 the sealing surface has the swallowtail shape of a double wiper seal so that during motion the air pressure in the expanding chamber exerts a radial pressure on the trailing edge to maintain a positive seal.

In an alternative embodiment of the invention the valve housing is of metal and has a rubber-lined inner surface. A vane of glass-reinforced polyester resin is mounted on a shaft passing through the housing with its periphery fitting tightly against the rubber lining of the housing, dividing the housing into two operating chambers. The surface of contact is shaped so that the tight fit is maintained as the vane rotates. The rubber lining covers completely the region of contact between the housing and vane including the perimeter of the shaft passage.

I claim:

1. A pressure fluid operator actuator comprising an actuator housing formed of thermosetting resin with an inner surface defining a cavity, a stiff rotary vane within said cavity separating the cavity into two actuating chambers, said vane having an integrally molded rubber covering formed with a deformable sealing edge engaging the cavity surface between said chambers under compression to provide a fluidtight seal between said chambers.

2. A pressure fluid operated actuator as recited in claim 1, wherein said sealing edge is convex.

3. A pressure fluid operated actuator as claimed in claim 1, wherein said sealing edge is concave.

4. A pressure fluid operated actuator as claimed in claim 1, wherein said sealing edge has diverging portions engaging said surface so that during motion of the vane in one direction pressure of the fluid in the expanding chamber exerts a substantially radial pressure on the trailing portion to maintain a positive seal.